United States Patent [19]

Takeda

[11] Patent Number: 4,831,480

[45] Date of Patent: May 16, 1989

[54] CARRIAGE APPARATUS FOR SIGNAL RECORDING AND REGENERATING EQUIPMENT

[75] Inventor: Yasuyuki Takeda, Kokubunji, Japan

[73] Assignee: Polyplastics Co., Ltd., Osaka, Japan

[21] Appl. No.: 123,779

[22] Filed: Nov. 23, 1987

[30] Foreign Application Priority Data

Nov. 26, 1986 [JP] Japan .................................. 61-281463

[51] Int. Cl.4 .......................... G11B 5/55; G11B 21/08
[52] U.S. Cl. ..................................... 360/106; 360/104
[58] Field of Search ................ 360/104, 105, 106, 109

[56] References Cited

U.S. PATENT DOCUMENTS

| | | | |
|---|---|---|---|
| 4,414,778 | 11/1983 | Carli | 74/89.21 |
| 4,418,371 | 11/1983 | Menden | 360/106 |
| 4,524,400 | 6/1985 | Cartwell | 360/106 |
| 4,658,315 | 4/1987 | Seki et al. | 360/104 |
| 4,669,014 | 5/1987 | Cartwell | 360/109 |
| 4,704,641 | 11/1987 | Okita | 360/105 |

Primary Examiner—Stuart N. Hecker
Assistant Examiner—David J. Severin
Attorney, Agent, or Firm—Birch, Stewart, Kolasch & Birch

[57] ABSTRACT

A carriage apparatus which comprises a magnetic head and a carriage comprising a liquid crystal polyester being thermotropic and being capable of forming the anisotropic phase in the molten state and an inorganic filler.

5 Claims, 1 Drawing Sheet

CARRIAGE APPARATUS FOR SIGNAL RECORDING AND REGENERATING EQUIPMENT

BACKGROUND OF THE INVENTION

Field of the Invention

The present invention relates to a carriage device for use particularly in a floppy disk device.

1—carriage body
2—rail
3, 4—sliding bearing portions
5, 6—magnetic heads

DISCUSSION OF RELATED ART

Figure 1:
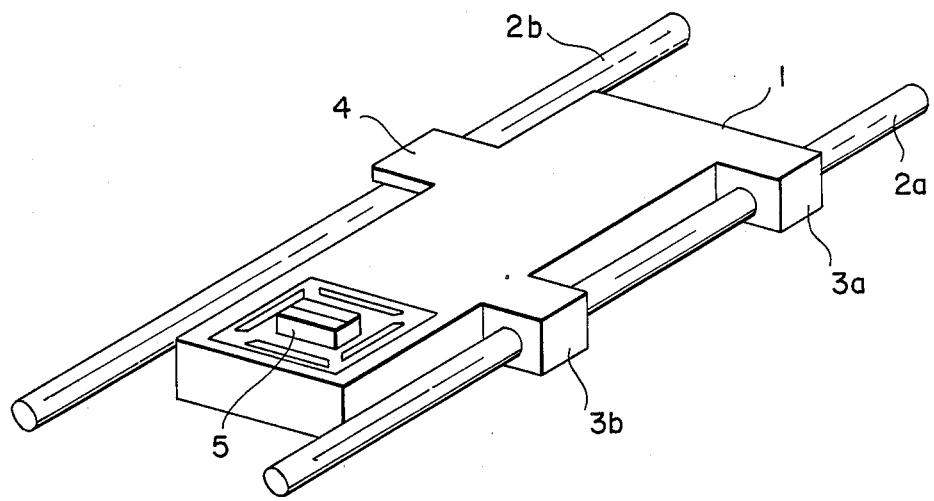
FIG. 1 is a perspective view of one form of the carriage device of the present invention.

In a floppy disk device, information is generally recorded or regenerated by means of a magnetic head with a magnetic recording medium being rotated. The magnetic head is usually supported by a carriage device and is moved toward a predetermined track on the magnetic recording medium when required. The carriage device has a structure, e.g., as shown in FIG. 1. Specifically, carriage body 1 is provided on its one side portion with cylindrical sliding bearing portions 3a, 3b. The bearing portions (hereinafter referred to as "main sliding bearing portion") 3a, 3b are each provided contiguous to carriage body 1 at a predetermined position such that carriage body 1 can be stably held by main rail 2a. On the other hand, the other side portion of carriage body 1 is provided with a sliding bearing portion (hereinafter referred to as "subsliding bearing portion") 4 having a square U shape. Carriage body 1 is held by main rail 2a which is disposed so as to pierce main sliding bearing portions 3a, 3b and subrail 2b which is interposed between the uper and lower sides of subsliding bearing portion 4 and is guided thereby when it is moved. Main rail 2a and subrail 2b are fixed parallel to a frame (not shown) of a floppy disk device. As shown in FIG. 1, the carriage is provided on its head surface portion with magnetic head 5 which is fixed by means of a metallic leaf spring.

Figure 2:
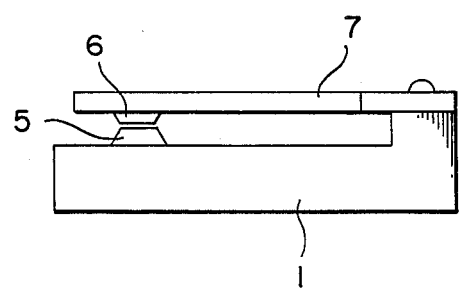
FIG. 2 is a schematic side view of the carriage device of the present invention to which a gimbal frame is connected.

As shown in FIG. 2, the carriage is generally provided with magnetic head 6 which is held by arm 7 connected to carriage body 1 and is vertically opposed to magnetic head 5 provided on the side of carriage body 1.

During operation of the floppy disk device (i.e., during reading or writing of data), the carriage is slide on main rail 2a and subrail 2b at main sliding bearing portions 3a, 3b and subsliding bearing portions 4 to allow it to move towards a medium not shown in the drawing. The carriage is generally moved in such a manner that the driving force of a stepping motor is transferred with a steel belt or a lead screw. Magnetic head 5 on the carriage is brought into contact with the magnetic recording medium, thereby conducting the reading or writing of data.

The carriage has hitherto been made of a glass fiber-reinforced polycarbonate or the like. However, the coefficient of linear expansion thereof is quite different from that of a floppy disk (PET sheet; $2.5 \times 10^{-5}$ cm/cm/°C) and that of a chassis (die cast aluminum; $2.4 \times 10^{-5}$ cm/cm/°C). This causes a difference in the absolute dimension therebetween as the environmental temperature is varied, which raises a problem that erroneous signals are picked up. Further, in recent years, with an increase in recording density, the development of a carriage having physical properties equal to those of aluminum, i.e., having a coeffecient of thermal expansion equal to that of aluminum has been demanded.

SUMMARY OF THE INVENTION

The present inventors have noted that a thermotropic liquid crystal polyester (hereinafter abbreviated as the "liquid crystal polyester") which exhibits anisotropy in a molten state is suitable as a material for a carriage device by virtue of its physical properties and proceeded with studies on the liquid crystal polyester.

The liquid crystal polyester has high strength, high modulus of elasticity, low factor of mold shrinkage, and low coefficient of thermal expansion, which renders it suitable for use in the production of high precision moldings. However, since the liquid crystal polyester is highly likely to be oriented in the direction of flow, the above-mentioned physical properties vary considerably depending upon the directions. Therefore, the liquid crystal polyester per se cannot be used in a carriage device.

The present inventors further proceeded with the studies. As a result, the present inventors have found that a composition comprising a liquid crystal polyester and 0.5 to 70% by weight, based on the total weight of the composition, of an inorganic filler incorporated therein, has physical properties which are best suited for use in the production of a carriage device, which led to the completion of the present invention.

DETAILED DESCRIPTION OF THE INVENTION

A carriage apparatus of the present invention comprises a magnetic head and a carraige means comprising a liquid crytal polyester being thermotropic and being capable of forming the anisotropic phase in the molten state and an inorganic filler.

It is preferable that the carriage means comprises 30 to 99.5 percent by weight of the polyester and 70 to 0.5 percent by weight of the inorganic filler and the carriage means has substantially the same coefficient of thermal expansion as the chassis.

Specifically, in accordance with the present invention, there is provided a carriage device comprising a composition comprised mainly of a liquid crystal polyester and an inorganic filler.

The liquid crystal polyester which may be used in the present invention is a melt processable polyester and has properties such that the molecular chains are regularly arranged parallel to each other in a molten state. The state in which molecules are arranged in this way is often called a liquid crystal state or a nematic phase of a liquid crystal material. Such polymer molecules are generally comprised of polymers which are slender and flat and have considerably high rigidity along the major axis of the molecules and a plurality of chain-extending bonds which are usually in either a coaxial relationship or a parallel relationship with each other.

The properties of the anisotropic molten phase may be examined by a customary polarimetric method using crossed polarizers. More particularly, the anisotropic molten phase can be examined by observing a molten sample placed on a Leitz hot stage in a nitrogen atmosphere at a magnification of 40 under a Leitz polarization microscope. The above-mentioned polymer is optically anisotropic. Namely, when it is placed between crossed polarizers, it permits the transmission of a light beam. If the sample is optically anisotropic, the polarized light will be transmitted, even when it is in a static state.

The components of the polymer which form the anisotropic molten phase as mentioned above are those selected from the group consisting of:

(1) at least one member selected from the group consisting of aromatic dicarboxylic acids and alicyclic dicarboxylic acids;
(2) at least one member selected from the group consisting of aromatic diols, alicyclic diols, and aliphatic diols;
(3) at least one member selected from the group consisting of aromatic hydroxy carboxylic acids;
(4) at least one member selected from the group consisting of aromatic thiol carboxylic acids;
(5) at least one member selected from the group consisting of aromatic dithiols and aromatic thiol phenols; and
(6) at least one member selected from the group consisting of aromatic hydroxy amines and aromatic diamines.

The polymer which forms the anisotropic molten phase is a polyester capable of forming an anisotropic molten phase and comprised of a combination of components such as:

(I) a polyester comprised of the components (1) and (2);
(II) a polyester comprised of only the component (3);
(III) a polyester comprised of the components (1), (2), and (3);
(IV) a polythiol-ester comprised of only the component (4);
(V) a polythiol-ester comprised of the components (1) and (5);
(VI) a polythiol-ester comprised of the components (1), (4), and (5);
(VII) a polyester-amide comprised of the components (1), (3), and (6); and
(VIII) a polyester-amide comprised of the components (1), (2), (3), and (6).

Aromatic polyazomethines are also polymers which form the anisotropic molten phase, although they are not included in the category of the above-mentioned combinations of components. Particular examples of such aromatic polyazomethines include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne; and poly(-nitrilo-2-chloro-1,4-phenylenenitrilomethylidyne-1,4-phenylenemethylidyne).

Further, polyester carbonates are also a polymer which forms the anisotropic molten phase, although they are not included in the category of the abovementioned combinations of components. They are comprised essentially of 4-oxybenzoyl units, dioxyphenyl units, dioxycarbonyl units, and terephthaloyl units.

The above-mentioned polyesters (I), (II), and (III) and polyester-amide (VIII) which are polymers capable of forming an anisotropic molten phase suitable for use in the present invention may be produced by various ester forming processes in which organic monomer compounds having functional groups capable of forming required repetitive units through condensation are mutually reacted. Examples of the functional groups of these organic monomer compounds include carboxyl group, hydroxyl group, ester group, acyloxy group, acyl halide group, and amino group. The organic monomer compounds can be reacted by a melt acidolysis method in the absence of any heat exchange field. According to this method, the monomers are first heated together to form a melt of reactants. As the reaction proceeds, solid polymer particles are suspended in the melt. Vacuum may be applied in order to facilitate the removal of volatile matter (e.g., acetic acid or water) which is produced as a by-product in the final stage of the condensation.

Further, a slurry condensation method may also be adopted in forming a liquid crystal aromatic polyester suitable for use in the present invention. In this method, the solid product is obtained in such a state that it is suspended in a heat exchange medium.

In both the above-mentioned melt acidolysis process and slurry polymerization process, the organic monomer reactants from which the liquid crystal polyester is derived may be used in the reaction in a modified form in which the hydroxyl groups of such monomers ahve been esterified (i.e., in the form of a lower acyl ester). The lower acyl group preferably has 2 to 4 carbon atoms. It is preferred that acetates of the organic monomer reactants be used in the reaction.

Representative examples of the catalyst which can be used at will in both the melt acidolysis and slurry process include dialkyltin oxides (e.g., dibutyltin oxide), diaryltin oxides, titanium dioxide, antimony trioxide, alkoxytitanium silicate, titanium alkoxide, alkali and alkaline earth metal salts of carboxylic acids (e.g., zinc acetate), Lewis acids (e.g., $BF_3$) and gaseous catalysts such as hydrogen halides (e.g., HCl). The amount of the catalyst is generally about 0.001 to 1% by weight, preferably about 0.01 to 0.2% by weight, based on the total weight of the monomers.

The liquid crystal polymers suitable for use in the present invention tend to be substantially insoluble in the usual solvents, which renders these polymers as being unsuitable for use in solution processing. However, as mentioned above, these polymers may be readily processed by ordinary melt processing. Especially preferable liquid crystal polymers are those which are soluble in pentafluorophenol to some extent.

The liquid crystal polyester suitable for use in the present invention have a weight-average molecular weight of about 2,000 to 200,000, preferably about 10,000 to 50,000, and particularly preferably about 20,000 to 25,000. On the other hand, the wholly aromatic polyester-amide suitable for the present invention has a molecular weight of about 5,000 to 50,000, preferably about 10,000 to 30,000, e.g., 15,000 to 17,000. The molecular weight may be determined by gel permeation chromatography and other standard determination methods which do not involve the formation of a solution of polymers, e.g., by determining the terminal groups by infrared spectroscopy in the form of a compression-molded film. Alternatively, the molecular weight may be determined by a light scattering method in the form of a pentafluorophenol solution.

The above-mentioned liquid crystal polyesters and polyester-amides exhibit an inherent viscosity (I.V.) of at least about 2.0 dl/g, e.g., about 2.0 to 10.0 dl/g, as determined at 60° C. in the form of a solution prepared by dissolving the polymer in pentafluorophenol to have a polymer concentration of 0.1% by weight.

Polyesters which form an anisotropic melt phase suitable for use in the present invention are aromatic polyesters and aromatic polyester-amides and may also include polyesters which partially contain aromatic polyester units and aromatic polyester-amide units in the same molecular chain.

Examples of the compounds constituting the above-mentioned polymers include naphthalene compounds such as 2,6-naphthalenedicarboxylic acid, 2,6-dihydroxynaphthalene, 1,4-dihydroxynaphthalene, and 6-hydroxy-2-naphthoic acid, biphenyl compounds such as 4,4'-biphenyldicarboxylic acid and 4,4'-dihydroxybiphenyl, compounds represented by the following general formulae (I), (II), or (III):

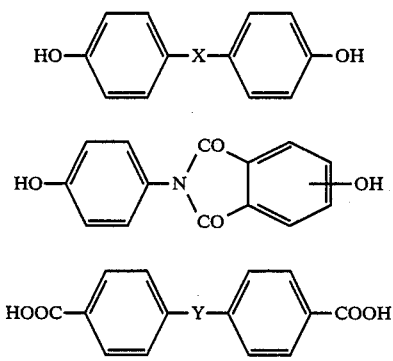

[wherein X is a group selected from among an alkylene (having 1 to 4 carbon atoms), an alkylidene, -O-, -SO-, -SO$_2$-, -S-, and -CO-; and Y is a group selected from -(CH$_2$)$_n$- (wherein n is 1 to 4) and -O(CH$_2$)$_n$O- (wherein n is 1 to 4)]; para-substituted benzene compounds such as p-hydroxybenzoic acid, terephthalic acid, hydroquinone, p-aminophenol, and p-phenylenediamine and nucleus-substituted compounds thereof (wherein the substituent is selected from among chlorine, bromine, methyl, phenyl, and 1-phenylethyl); and meta-substituted benzene compounds such as isophthalic acid and resorcinol.

Further, the liquid crystal polyester which is used in the present invention may be a polyester partially containing a polyalkylene terephthalate portion which does not exhibit any anisotropic melt phase in the same molecular chain besides the above-mentioned components. In this case, the alkyl group has 2 to 4 carbon atoms.

Among the polymers comprised of the above-mentioned components, polymers containing at least one member selected from among naphthalene compounds, biphenyl compounds, and para-substituted benzene compounds as essential components are more preferable. Particularly preferable para-substituted benzene compounds include p-hydrobenzoic acid, methylhydroquinone, and 1-phenylethylhydroquinone.

Polyesters capable of forming an anisotropic melt phase which are particularly preferably used in the present invention are those containing about 10 mol % or more of repetitive units containing a naphthalene portion, such as 6-hydroxy-2-naphthoyl, 2,6-dihydroxynaphthalene, and 2,6-dicarboxynaphthalene. Preferable polyester-amides are those containing repetitive units containing the above-mentioned naphthalene portion and a portion comprised of 4-aminophenol or 1,4-phenylenediamine.

Specific examples of the compounds which are components in the above-mentioned polymers (I) to (VIII) and specific examples of polyesters capable forming an anisotropic melt phase and suitable for use in the present invention are described in Japanese Patent Laid-Open No. 69866/1986.

Examples of the inorganic filler useful for the present invention include materials which are used as additives to general thermoplastic resins and thermosetting resins, i.e., general inorganic fibers such as glass fiber, carbon fiber, metallic fiber, ceramic fiber, boron fiber, potassium titanate fiber, and asbestos; and powdery or sheet inorganic fillers such as calcium carbonate, silicates, alumina, aluminum hydroxide, talc, clay, mica, glass flake, powdery glass, glass beads, quartz sand, silica sand, wollastonite, various powdery metals, carbon black, barium sulfate, plaster of Paris, silicon carbide, alumina, boron nitrite, and silicon nitride; and whisker and metallic whisker.

The above-mentioned inorganic fillers may be used alone or in a combination of two or more. It is preferred that fibrous materials having a high modulus of elasticity be used.

The amount of the inorganic filler to be blended with the liquid crystal polyester may be properly selected according to the materials of the rail or other parts associated with the carriage device, since the coefficient of thermal expansion varies depending upon the amount of the filler to be blended. In general, the inorganic filler is blended in an amount of 0.5 to 70% by weight, preferably 10 to 50% by weight, based on the total amount of the composition.

For example, when the chassis is made of aluminum, the same coefficient of thermal expansion can be attained by blending about 20 to 50% by weight of a glass fiber as an essential component. On the other hand, when the chassis is made of a steel sheet, the same coefficient of thermal expansion can be attained by blending about 20 to 30% by weight of a carbon fiber as an essential component.

Other additives which are usually employed, such as dyes, pigments, and lubricants, may be incorporated in these compositions.

In the foregoing description, the carriage device of the present invention was mainly described with reference to a case where a magnetic head is mounted. However, in the above-mentioned carriage device, the magnetic head may be replaced by an opticalpickup, and the present invention is applicable regardless of the types of recording and regenerating systems.

The carriage device of the present invention allows for the best use of the properties of a liquid crystal polyester, such as high dimensional accuracy, high strength, high modulus of elasticity, low coefficient of thermal expansion, high vibration damping factor, and low change in dimension accompanying moisture absorption, and further has the same coefficient of thermal expansion as those of metallic parts adjacent to a floppy. This eliminates the need for consideration on the provision of a play with respect to thermal expansion in the stage of design, which not only allows it to be possible to prepare an accurate design which leads to an accurate positioning of a magnetic head on a disk, but also contributes to a reduction in the deviation of the position accompanying changes in temperature and humidity after production of the device.

The above-mentioned advantage on the dimensional accuracy and excellent vibration damping factor contributes to a reduction in the deviation of the position of the magnetic head. Further, the thickness of the device can be reduced, which advantageously allows it to be possible to reduce the weight of the device, thus leading to a reduction in the size of a stepping motor. This in turn contributes to a reduction in size of a floppy disk drive device.

The present invention will now be described in more detail with reference to the following examples that should not be construed as limiting the scope of the present invention.

EXAMPLE 1

Carriages as shown in FIG. 1 having a maximum width of 20 mm and a maximum length of 60 mm were manufactured by injection molding after the position of a gate was set so that the direction of the resin flow is in agreement with the longitudinal direction of the resulting carriage, using a compositions respectively prepared by blending liquid crystal polyester resins A, B, C, D, and E with 25% by weight of wollastonite and 25% by weight (based on the composition) of a glass fiber.

The coefficient of thermal expansion of the above-mentioned width and length portions was determined and found to be substantially the same as that of aluminum, as shown in Table 1.

TABLE 1

| resin | coefficient of thermal expansion (unit: $10^{-5}$ cm/cm/°C.) |
|---|---|
| resin A | 1.9 |
| resin B | 2.1 |
| resin C | 2.3 |
| resin D | 2.4 |
| resin E | 2.7 |

Each of these carriages was incorporated in a floppy disk drive device equipped with a chassis made of die cast aluminum. When the position of the magnetic head against the chassis at a temperature of 23° C. is taken as a standard point, the maximum deviation of the magnetic head from the standard point at temperatures ranging from −10° to +60° C. was as follows:

| resin A | −1.3 μm |
|---|---|
| resin B | −0.6 μm |
| resin C | −0.2 μm |
| resin D | 0.1 μm |
| resin E | 0.3 μm |

EXAMPLE 2

Resins A, B, C, D, and E were each blended with 30% by weight (based on the composition) of a carbon fiber to prepare compositions. The same procedures as in Example 1 were repeated to manufacture carriages and to determine the coefficient of thermal expansion. The results were as shown in Table 2.

TABLE 2

| resin | coefficient of thermal expansion (unit: $10^{-5}$ cm/cm/°C.) |
|---|---|
| resin A | 1.1 |
| resin B | 1.2 |
| resin C | 1.3 |
| resin D | 1.3 |
| resin E | 1.8 |

Each of these carriages was incorporated in a floppy disk drive device equipped with a chassis made of steel. When the position of the magnetic head against the chassis at a temperature of 23° C. is taken as a standard point, the maximum deviation of the magnetic head from the standard point at temperatures ranging from −10° to +60° C. was as follows:

| resin A | 0.1 μm |
|---|---|
| resin B | 0.2 μm |
| resin C | 0.5 μm |
| resin D | 0.6 μm |
| resin E | 0.6 μm |

COMPARATIVE EXAMPLE 1

The same carriages were manufactured using polyphenylene sulfide containing 40% by weight of a glass fiber, polycarbonate containing 30% by weight of a glass fiber and 10% by weight of a fluorocarbon resin, and aluminum. The carriages thus manufactured were each incorporated in a floppy disk drive device equipped with a chassis made of die case aluminum. When the position of the magnetic head against the chassis at a temperature of 23° C. is taken as a standard point, the maximum deviation of the magnetic head from the standard point at temperatures ranging from −10° to +60° C. was as follows.

| polyphenylene sulfide containing 40% by weight of a glass fiber | 10 μm |
|---|---|
| polycarbonate containing 30% by weight of a glass fiber and 10% by weight of a fluorocarbon resin | 10 μm |
| aluminum | 0.1 μm |

The resins A to E were respectively comprised of the following structural units:

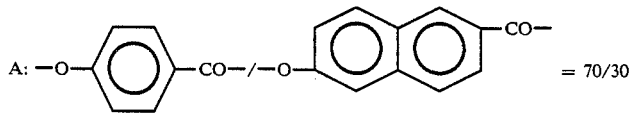

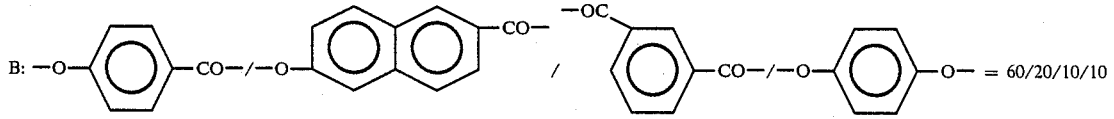

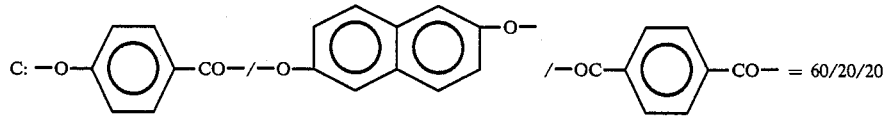

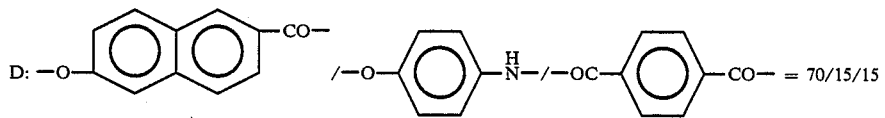

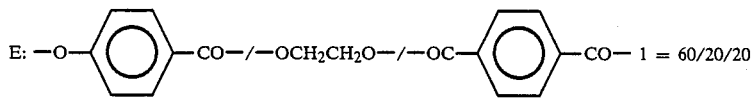

(The above numerals represent molar ratios.)

What is claimed is:

1. A carriage apparatus supporting a magnetic head for recording and regenerating a signal on a magnetic medium, which apparatus comprises a solid polyester composition containing 0.5 to 70% of an inorganic filler, said polyester being capable of forming the anisotropic phase in the molten state.

2. The carriage apparatus as claimed in claim 1, in which the solid composition contains a mixture of two or more inorganic fillers.

3. The carriage apparatus as claimed in claim 1, in which the inorganic filler is a fibrous material having a high modulus of elasticity.

4. The carriage apparatus as claimed in claim 3, in which the fibrous material is a glass fiber blended into the polyester in an amount of 20 to 50% by weight of the solid polyester composition so as to achieve a coefficient of thermal expansion similar to that of aluminum.

5. The carriage apparatus as claimed in claim 3, in which the fibrous material is a carbon fiber blended into the polyester in an amount of 20 to 30% by weight of the solid polyester composition so as to achieve a coefficient of thermal expansion similar to that of steel.

* * * * *